(12) United States Patent
Harris et al.

(10) Patent No.: US 11,377,232 B2
(45) Date of Patent: Jul. 5, 2022

(54) COMBINED INFORMATION FOR OBJECT DETECTION AND AVOIDANCE

(71) Applicant: Amazon Technologies, Inc., Seattle, WA (US)

(72) Inventors: Scott Raymond Harris, Bainbridge Island, WA (US); Barry James O'Brien, Seattle, WA (US); Joshua John Watson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/525,271

(22) Filed: Jul. 29, 2019

(65) Prior Publication Data

US 2020/0108946 A1    Apr. 9, 2020

Related U.S. Application Data

(63) Continuation of application No. 15/913,599, filed on Mar. 6, 2018, now Pat. No. 10,364,044, which is a
(Continued)

(51) Int. Cl.
*B64D 47/08* (2006.01)
*H04N 5/33* (2006.01)
(Continued)

(52) U.S. Cl.
CPC ............ *B64D 47/08* (2013.01); *B64C 39/024* (2013.01); *G06T 7/593* (2017.01); *G06V 20/13* (2022.01);
(Continued)

(58) Field of Classification Search
None
See application file for complete search history.

(56) References Cited

U.S. PATENT DOCUMENTS 5,034,759 A * 7/1991 Watson .................. B64D 47/08
                                                                    396/7
5,173,710 A * 12/1992 Kelley .................. G01S 5/0009
                                                                   342/463
(Continued)

FOREIGN PATENT DOCUMENTS

CN       102707724 A    10/2012
CN       104076817 A    10/2014
(Continued)

OTHER PUBLICATIONS

Search Report IP.com.*
(Continued)

*Primary Examiner* — Mohammad J Rahman
(74) *Attorney, Agent, or Firm* — Athorus, PLLC

(57) ABSTRACT

Described is an imaging component for use by an unmanned aerial vehicle ("UAV") for object detection. As described, the imaging component includes one or more cameras that are configured to obtain images of a scene using visible light that are converted into a depth map (e.g., stereo image) and one or more other cameras that are configured to form images, or thermograms, of the scene using infrared radiation ("IR"). The depth information and thermal information are combined to form a representation of the scene based on both depth and thermal information.

29 Claims, 9 Drawing Sheets

Related U.S. Application Data continuation of application No. 15/083,153, filed on Mar. 28, 2016, now Pat. No. 9,963,246.

(51) Int. Cl.
| | |
|---|---|
| *G08G 5/04* | (2006.01) |
| *B64C 39/02* | (2006.01) |
| *H04N 13/239* | (2018.01) |
| *G06T 7/593* | (2017.01) |
| *G06K 9/00* | (2022.01) |
| *H04N 13/271* | (2018.01) |
| *H04N 13/25* | (2018.01) |
| *H04N 13/243* | (2018.01) |
| *G06V 20/13* | (2022.01) |
| *G06V 10/10* | (2022.01) |
| *G06V 20/10* | (2022.01) |

(52) U.S. Cl.
CPC ............... *G08G 5/045* (2013.01); *H04N 5/33* (2013.01); *H04N 13/239* (2018.05); *H04N 13/243* (2018.05); *H04N 13/25* (2018.05); *H04N 13/271* (2018.05); *B64C 2201/027* (2013.01); *B64C 2201/108* (2013.01); *B64C 2201/127* (2013.01); *B64C 2201/128* (2013.01); *B64C 2201/145* (2013.01); *B64C 2201/165* (2013.01); *G06T 2207/10012* (2013.01); *G06T 2207/10048* (2013.01); *G06V 10/16* (2022.01); *G06V 20/194* (2022.01)

(56) References Cited

U.S. PATENT DOCUMENTS

| | | | | |
|---|---|---|---|---|
| 5,499,032 | A * | 3/1996 | Kelley | G01S 5/0009 |
| | | | | 342/457 |
| 5,774,829 | A * | 6/1998 | Cisneros | G01S 19/31 |
| | | | | 701/475 |
| 5,779,190 | A * | 7/1998 | Rambo | B64C 39/024 |
| | | | | 244/118.2 |
| 6,954,488 | B1 * | 10/2005 | Lennen | G01S 19/32 |
| | | | | 375/149 |
| 9,031,782 | B1 * | 5/2015 | Lemay | G01S 19/48 |
| | | | | 701/445 |
| 9,321,531 | B1 * | 4/2016 | Takayama | B64D 1/12 |
| 9,350,954 | B2 * | 5/2016 | Wagreich | G05D 1/0016 |
| 9,749,547 | B2 * | 8/2017 | Venkataraman | G02B 13/0015 |
| 9,958,870 | B1 * | 5/2018 | Graybill | G05D 1/02 |
| 9,986,233 | B1 | 5/2018 | Curlander et al. | |
| 10,033,980 | B2 * | 7/2018 | Boyd | G01C 3/10 |
| 10,250,871 | B2 * | 4/2019 | Ciurea | G06T 5/006 |
| 10,364,044 | B2 * | 7/2019 | Harris | H04N 13/239 |
| 10,397,550 | B2 * | 8/2019 | Dumont | H04N 5/2256 |
| 10,499,037 | B1 * | 12/2019 | Wilcox | H04N 5/2251 |
| 2003/0208335 | A1 * | 11/2003 | Unuma | A61B 5/6828 |
| | | | | 702/141 |
| 2007/0061041 | A1 * | 3/2007 | Zweig | G05D 1/0261 |
| | | | | 700/245 |
| 2008/0272955 | A1 * | 11/2008 | Yonak | H01Q 25/002 |
| | | | | 342/54 |
| 2009/0321636 | A1 * | 12/2009 | Ragucci | G01S 19/14 |
| | | | | 250/330 |
| 2010/0256909 | A1 * | 10/2010 | Duggan | G08G 5/0069 |
| | | | | 701/301 |
| 2010/0306249 | A1 * | 12/2010 | Hill | G06Q 50/01 |
| | | | | 707/769 |
| 2010/0310125 | A1 * | 12/2010 | Hsieh | G01C 11/04 |
| | | | | 382/103 |
| 2011/0181720 | A1 * | 7/2011 | Edgeworth | G01J 5/02 |
| | | | | 348/144 |
| 2014/0189859 | A1 * | 7/2014 | Ramanan | G06F 21/56 |
| | | | | 726/22 |
| 2015/0009140 | A1 * | 1/2015 | Chia | G06F 3/0317 |
| | | | | 345/158 |
| 2015/0242700 | A1 * | 8/2015 | Zhang | G06T 7/66 |
| | | | | 382/154 |
| 2015/0356341 | A1 * | 12/2015 | Eccles | G06T 7/38 |
| | | | | 382/224 |
| 2016/0026880 | A1 | 1/2016 | Lee et al. | |
| 2016/0105649 | A1 * | 4/2016 | Pettegrew | G06T 7/80 |
| | | | | 348/37 |
| 2016/0132748 | A1 * | 5/2016 | Tillotson | B64C 39/024 |
| | | | | 348/222.1 |
| 2016/0341554 | A1 * | 11/2016 | Hillier | G01C 11/02 |
| 2016/0381345 | A1 * | 12/2016 | Wu | G06T 7/85 |
| | | | | 348/36 |
| 2017/0064278 | A1 * | 3/2017 | Posselius | G06T 5/50 |
| 2017/0270362 | A1 * | 9/2017 | Barnehama | G06T 19/003 |
| 2018/0054604 | A1 * | 2/2018 | Boyd | B64C 39/024 |
| 2018/0194489 | A1 * | 7/2018 | Harris | H04N 13/239 |
| 2019/0019141 | A1 * | 1/2019 | Torii | G06Q 10/0832 |

FOREIGN PATENT DOCUMENTS

| | | |
|---|---|---|
| CN | 105182983 A | 12/2015 |
| GB | 2511863 A | 9/2014 |
| WO | 2015161208 A1 | 10/2015 |

OTHER PUBLICATIONS

Search Report dated Jan. 21, 2020, in corresponding CN Application No. 201780019508.8.

Hoegner, L. et al. "Towards people detection from fused time-of-flight and thermal infrared images," ISPRS—International Archives of the Photogrammetry, Remote Sensing and Spatial Information Sciences, vol. XL-3, Aug. 11, 2014, pp. 121-126, XP055373882.

International Search Report and Written Opinion for PCT Application No. PCT/US17/23905 dated Jun. 16, 2017.

Johnson, M J et al. "Integration of thermal and visible imagery for robust foreground detection in tele-immersive spaces" Information Fusion, 2008,11th International Conference on, IEEE, Piscataway, NJ, USA, Jun. 30, 2008, pp. 1-8, XP031931991.

Search Report dated Jul. 11, 2019, in corresponding CN Application No. 201780019508.8.

* cited by examiner

COMBINED INFORMATION FOR OBJECT DETECTION AND AVOIDANCE

PRIORITY CLAIM

This application is a continuation of U.S. patent application Ser. No. 15/913,599, filed Mar. 6, 2018, and titled Combining Information for Object Detection and Avoidance, which is a continuation of U.S. Pat. No. 9,963,246, issued May 8, 2018, and titled "Combining Depth And Thermal Information For Object Detection And Avoidance," each of which are herein incorporated by referenced in their entirety.

BACKGROUND

The use of unmanned aerial vehicles ("UAV") having two or more propellers is increasingly common. Such vehicles include quad-copters (e.g., a UAV having four rotatable propellers), octo-copters (e.g., a UAV having eight rotatable propellers), or other vertical take-off and landing ("VTOL") aircraft having two or more propellers.

One of the benefits of UAVs is that they are highly maneuverable in the vertical and horizontal direction, are relatively small, and can be navigated into confined spaces that other, larger vehicles, cannot access.

BRIEF DESCRIPTION OF THE DRAWINGS

The detailed description is set forth with reference to the accompanying figures. In the figures, the left-most digit(s) of a reference number identifies the figure in which the reference number appears.

Figure 1:
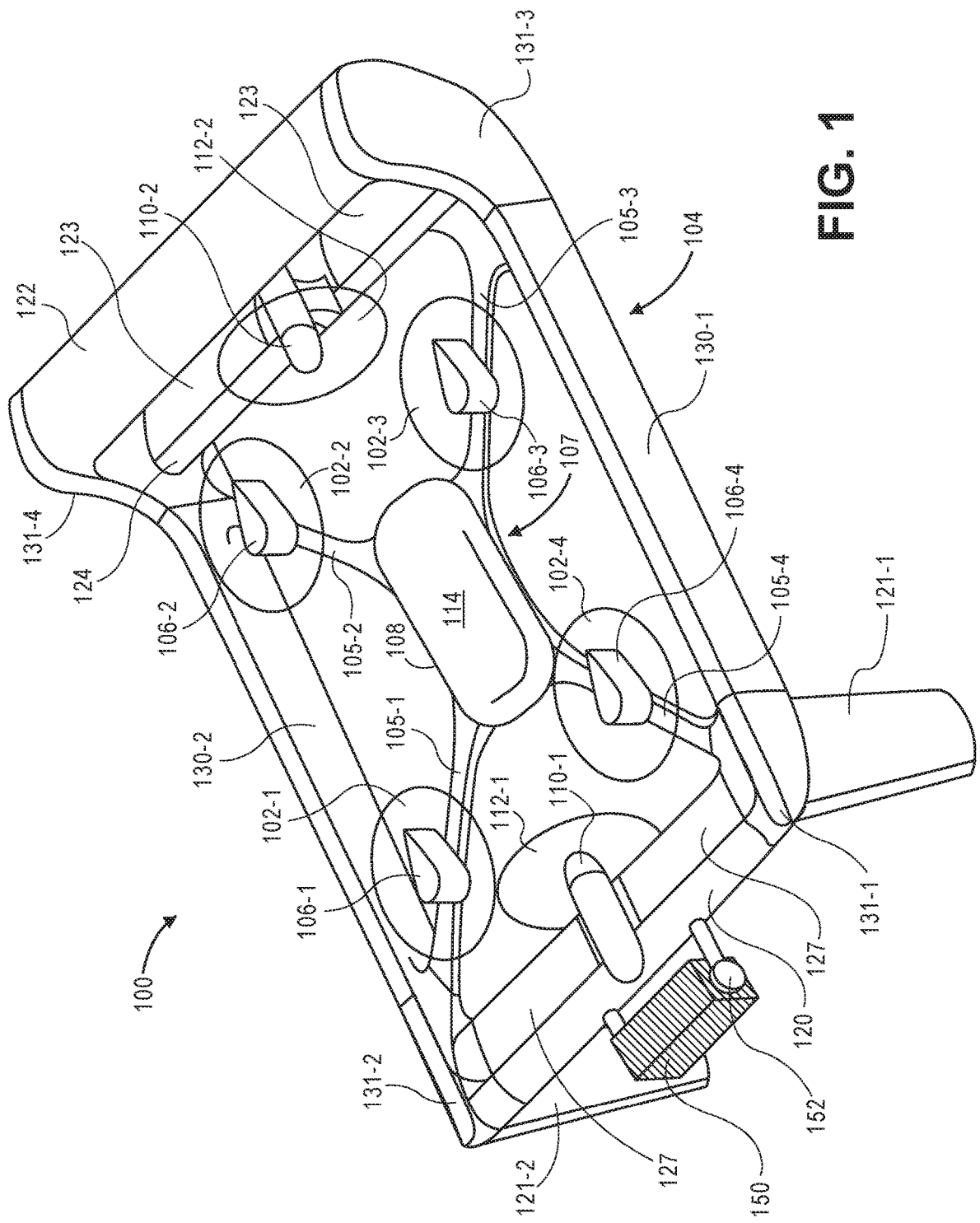
FIG. 1 depicts a view of an unmanned aerial vehicle configuration, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to." Additionally, as used herein, the term "coupled" may refer to two or more components connected together, whether that connection is permanent (e.g., welded) or temporary (e.g., bolted), direct or indirect (i.e., through an intermediary), mechanical, chemical, optical, or electrical. Furthermore, as used herein, "horizontal" or "transit" flight refers to flight traveling in a direction substantially parallel to the ground (i.e., sea level), and that "vertical" flight refers to flight traveling substantially radially outward from the earth's center. It should be understood by those having ordinary skill that trajectories may include components of both "horizontal" or "transit" and "vertical" flight vectors.

DETAILED DESCRIPTION

This disclosure describes an imaging component for use by an unmanned aerial vehicle ("UAV") for object detection. As described, the imaging component includes one or more cameras that are configured to obtain images of a scene using visible light that are converted into a depth map (e.g., stereo image) and one or more other cameras that are configured to form images of the scene using infrared radiation ("IR"). For example, the imaging component may include a first camera and a second camera that are separated by a known baseline distance such that a field of view of the first camera overlaps with at least a portion of the field of view of the second camera. The first camera and the second camera are configured to form images using visible light. The imaging component may likewise include a third camera that is approximately equidistant between the first camera and the second camera. The third camera is configured to form a third image, or thermogram, of the scene using infrared radiation.

Each of the cameras may be controlled by and send the formed images to a single processing component. The processing component processes the two visual images to generate a three-dimensional ("3D") representation, such as a stereo image, that includes a depth map in which each pixel of the 3D representation corresponds to a horizontal dimension, a vertical dimension, and a depth dimension. In addition, the processing component combines the 3D representation with the thermogram to produce combined information that provides a 3D and thermal information representative of the scene. Each pixel of the combined information includes at least a horizontal dimension, a vertical dimension, a depth dimension, and a thermal dimension. The thermal dimension may be represented by a visible color (e.g., red, green, blue combination), different colors corresponding to different thermal ranges, and/or other value.

The UAV control system may utilize the combined information to aid in object detection and avoidance. For example, the UAV may use the depth information to detect objects protruding above a surface of a delivery location and use the thermal information to determine whether the object is a warm-blooded or non-warm-blooded object. If the object is a warm-blooded object, the delivery of an item may be aborted, a descent of the UAV terminated, and/or the delivery position altered to avoid the warm-blooded object.

In some implementations, even though the protruding object has a thermal signature, it may be determined that the object is non-warm-blooded (e.g., a grill or lamp). Upon determining that the object is non-warm-blooded, the signature of the object may be retained and used during further UAV navigation to detect and avoid warm-blooded objects.

By combining both depth and thermal information for objects within a delivery area, safety to humans and/or other animals is improved and false detection of warm-blooded objects is reduced. For example, if a warm-blooded object, such as a dog, is laying near a delivery location, using only depth information the UAV may only be able to determine that the object (dog) protrudes from the surface but may not determine that the object is warm-blooded because the object is motionless. By combining thermal information with the depth information, the UAV can accurately determine that the object both protrudes from the surface and has a thermal signature in a range that corresponds with a warm-blooded object.

In a similar manner if a non-warm-blooded object, such as a chair, is near a delivery location, using only depth information, the UAV may only be able to determine that the objects protrude from the surface and may inaccurately determine that the objects are warm-blooded objects, thereby altering or aborting a delivery. By combining thermal information with the depth information, the UAV can accurately determine that the chair does not have a thermal signature in a range that corresponds with a warm-blooded object, and therefore may continue its descent. In some instances, a non-warm-blooded object may include a thermal signature that potentially corresponds with a warm-blooded object, because the non-warm-blooded object expels heat that is detected by the IR camera. For example, a lamp or BBQ may expel heat that is detected by the thermal camera. In such instances, the objects are detected as protruding from the surface and including a thermal signature that potentially corresponds with a warm-blooded object. In such an instance, the signature of the objects (e.g., depth information, thermal information) may be determined over a period of time and used to determine that the object is a non-warm-blooded object.

FIG. 1 illustrates a view of a UAV 100, according to an implementation. As illustrated, the UAV 100 includes a perimeter frame 104 that includes a front wing 120, a lower rear wing 124, an upper rear wing 122, and two horizontal side rails 130-1, 130-2. The horizontal side rails 130 are coupled to opposing ends of the front wing 120 and opposing ends of the upper rear wing 122 and lower rear wing 124. In some implementations, the coupling may be with a corner junction, such as the front left corner junction 131-1, the front right corner junction 131-2, the rear left corner junction 131-3, the rear right corner junction 131-4. In such an example, the corner junctions are also part of the perimeter frame 104.

The components of the perimeter frame 104, such as the front wing 120, lower rear wing 124, upper rear wing 122, side rails 130-1, 130-2, and corner junctions 131 may be formed of any one or more suitable materials, such as graphite, carbon fiber, aluminum, titanium, etc., or any combination thereof. In the illustrated example, the components of the perimeter frame 104 of the UAV 100 are each formed of carbon fiber and joined at the corners using corner junctions 131. The components of the perimeter frame 104 may be coupled using a variety of techniques. For example, if the components of the perimeter frame 104 are carbon fiber, they may be fitted together and joined using secondary bonding, a technique known to those of skill in the art. In other implementations, the components of the perimeter frame 104 may be affixed with one or more attachment mechanisms, such as screws, rivets, latches, quarter-turn fasteners, etc., or otherwise secured together in a permanent or removable manner.

The front wing 120, lower rear wing 124, and upper rear wing 122 are positioned in a tri-wing configuration and each wing provides lift to the UAV 100 when the UAV is moving in a direction that includes a horizontal component, also referred to herein as transit flight. For example, the wings may each have an airfoil shape that causes lift due to the airflow passing over the wings during transit flight.

Opposing ends of the front wing 120 may be coupled to a corner junction 131, such as the front left corner junction 131-1 and front right corner junction 131-2. In some implementations, the front wing may include one or more flaps 127 or ailerons, that may be used to adjust the pitch, yaw, and/or roll of the UAV 100 alone or in combination with the lifting motors 106, lifting propellers 102, thrusting motors 110, thrusting propellers 112, and/or other flaps on the rear wings, discussed below. In some implementations, the flaps 127 may also be used as a protective shroud to further hinder access to the lifting propellers 102 by objects external to the UAV 100. For example, when the UAV 100 is moving in a vertical direction or hovering, the flaps 127 may be extended to increase the height of the protective barrier around a portion of the lifting propellers 102.

In some implementations, the front wing 120 may include two or more pairs of flaps 127, as illustrated in FIG. 1. In other implementations, for example if there is no front thrusting motor 110-1, the front wing 120 may only include a single flap 127 that extends substantially the length of the front wing 120. If the front wing 120 does not include flaps 127, the lifting motors 106 and lifting propellers 102, thrusting motors 110, thrusting propellers 112 and/or flaps of the rear wings may be utilized to control the pitch, yaw, and/or roll of the UAV 100 during flight.

Opposing ends of the lower rear wing 124 may be coupled to a corner junction 131, such as the rear left corner junction 131-3 and rear right corner junction 131-4. In some implementations, the lower rear wing may include one or more flaps 123 or ailerons, that may be used to adjust the pitch, yaw and/or roll of the UAV 100 alone or in combination with the lifting motors 106, lifting propellers 102, thrusting motors 110, thrusting propellers 112, and/or the flaps 127 of the front wing. In some implementations, the flaps 123 may also be used as a protective shroud to further hinder access to the lifting propellers 102 by objects external to the UAV 100. For example, when the UAV 100 is moving in a vertical direction or hovering, the flaps 123 may be extended, similar to the extending of the front flaps 127 of the front wing 120.

In some implementations, the rear wing 124 may include two or more flaps 123, as illustrated in FIG. 1 or two or more pairs of flaps. In other implementations, for example if there is no rear thrusting motor 110-2 mounted to the lower rear wing, the rear wing 124 may only include a single flap 123 that extends substantially the length of the lower rear wing 124. In other implementations, if the lower rear wing includes two thrusting motors, the lower rear wing may be configured to include three flaps 123, one on either end of the lower rear wing 124, and one between the two thrusting motors mounted to the lower rear wing 124.

Opposing ends of the upper rear wing 122 may be coupled to a corner junction 131, such as the rear left corner junction 131-3 and rear right corner junction 131-4. In some implementations, like the lower rear wing, the upper rear wing 122 may include one or more flaps or ailerons, that may be used to adjust the pitch, yaw and/or roll of the UAV 100 alone or in combination with the lifting motors 106, lifting propellers 102, thrusting motors 110, thrusting propellers 112, and/or other flaps of other wings. In some implementations, the flaps may also be used as a protective shroud to further hinder access to the lifting propellers 102 by objects external to the UAV 100. For example, when the UAV 100 is moving in a vertical direction or hovering, the flaps may be extended, similar to the extending of the front flaps 127 of the front wing 120 or the flaps 123 of the lower rear wing.

The front wing 120, lower rear wing 124, and upper rear wing 122 may be positioned and sized proportionally to provide stability to the UAV while the UAV 100 is moving in a direction that includes a horizontal component. For example, the lower rear wing 124 and the upper rear wing 122 are stacked vertically such that the vertical lift vectors generated by each of the lower rear wing 124 and upper rear wing 122 are close together, which may be destabilizing during horizontal flight. In comparison, the front wing 120 is separated from the rear wings longitudinally such that the vertical lift vector generated by the front wing 120 acts together with the vertical lift vectors of the lower rear wing 124 and the upper rear wing 122, providing efficiency, stabilization and control.

In some implementations, to further increase the stability and control of the UAV 100, one or more winglets 121, or stabilizer arms, may also be coupled to and included as part of the perimeter frame 104. In the example illustrated with respect to FIG. 1, there are two front winglets 121-1 and 121-2 mounted to the underneath side of the front left corner junction 131-1 and the front right corner junction 131-2, respectively. The winglets 121 extend in a downward direction approximately perpendicular to the front wing 120 and side rails 130. Likewise, the two rear corner junctions 131-3, 131-4 are also formed and operate as winglets providing additional stability and control to the UAV 100 when the UAV 100 is moving in a direction that includes a horizontal component, such as transit flight.

The winglets 121 and the rear corner junctions 131 may have dimensions that are proportional to the length, width, and height of the UAV 100 and may be positioned based on the approximate center of gravity of the UAV 100 to provide stability and control to the UAV 100 during horizontal flight. For example, in one implementation, the UAV 100 may be approximately 64.75 inches long from the front of the UAV 100 to the rear of the UAV 100 and approximately 60.00 inches wide. In such a configuration, the front wing 120 has dimensions of approximately 60.00 inches by approximately 7.87 inches. The lower rear wing 124 has dimensions of approximately 60.00 inches by approximately 9.14 inches. The upper rear wing 122 has dimensions of approximately 60.00 inches by approximately 5.47 inches. The vertical separation between the lower rear wing and the upper rear wing is approximately 21.65 inches. The winglets 121 are approximately 6.40 inches wide at the corner junction with the perimeter frame of the UAV, approximately 5.91 inches wide at the opposing end of the winglet and approximately 23.62 inches long. The rear corner junctions 131-3, 131-4 are approximately 9.14 inches wide at the end that couples with the lower rear wing 124, approximately 8.04 inches wide at the opposing end, and approximately 21.65 inches long. The overall weight of the UAV 100 is approximately 50.00 pounds.

Coupled to the interior of the perimeter frame 104 is a central frame 107. The central frame 107 includes a hub 108 and motor arms 105 that extend from the hub 108 and couple to the interior of the perimeter frame 104. In this example, there is a single hub 108 and four motor arms 105-1, 105-2, 105-3, and 105-4. Each of the motor arms 105 extend from approximately a corner of the hub 108 and couple or terminate into a respective interior corner of the perimeter frame. In some implementations, each motor arm 105 may couple into a corner junction 131 of the perimeter frame 104. Like the perimeter frame 104, the central frame 107 may be formed of any suitable material, such as graphite, carbon fiber, aluminum, titanium, etc., or any combination thereof. In this example, the central frame 107 is formed of carbon fiber and joined at the corners of the perimeter frame 104 at the corner junctions 131. Joining of the central frame 107 to the perimeter frame 104 may be done using any one or more of the techniques discussed above for joining the components of the perimeter frame 104.

Lifting motors 106 are coupled at approximately a center of each motor arm 105 so that the lifting motor 106 and corresponding lifting propeller 102 are within the substantially rectangular shape of the perimeter frame 104. In one implementation, the lifting motors 106 are mounted to an underneath or bottom side of each motor arm 105 in a downward direction so that the propeller shaft of the lifting motor that mounts to the lifting propeller 102 is facing downward. In other implementations, as illustrated in FIG. 1, the lifting motors 106 may be mounted to a top of the motor arms 105 in an upward direction so that the propeller shaft of the lifting motor that mounts to the lifting propeller 102 is facing upward. In this example, there are four lifting motors 106-1, 106-2, 106-3, 106-4, each mounted to an upper side of a respective motor arm 105-1, 105-2, 105-3, and 105-4.

In some implementations, multiple lifting motors may be coupled to each motor arm 105. For example, while FIG. 1 illustrates a quad-copter configuration with each lifting motor mounted to a top of each motor arm, a similar configuration may be utilized for an octo-copter. For example, in addition to mounting a motor 106 to an upper side of each motor arm 105, another lifting motor may also be mounted to an underneath side of each motor arm 105 and oriented in a downward direction. In another implementation, the central frame may have a different configuration, such as additional motor arms. For example, eight motor arms may extend in different directions and a lifting motor may be mounted to each motor arm.

The lifting motors may be any form of motor capable of generating enough rotational speed with the lifting propellers 102 to lift the UAV 100 and any engaged payload, thereby enabling aerial transport of the payload.

Mounted to each lifting motor 106 is a lifting propeller 102-1, 102-2, 102-3, and 102-4. The lifting propellers 102 may be any form of propeller (e.g., graphite, carbon fiber) and of a size sufficient to lift the UAV 100 and any payload engaged by the UAV 100 so that the UAV 100 can navigate through the air, for example, to deliver a payload to a delivery location. For example, the lifting propellers 102 may each be carbon fiber propellers having a dimension or diameter of twenty-four inches.

While the illustration of FIG. 1 shows the lifting propellers 102 all of a same size, in some implementations, one or more of the lifting propellers 102 may be different sizes and/or dimensions. Likewise, while this example includes four lifting propellers 102-1, 102-2, 102-3, 102-4, in other implementations, more or fewer propellers may be utilized as lifting propellers 102. Likewise, in some implementations, the lifting propellers 102 may be positioned at different locations on the UAV 100. In addition, alternative methods of propulsion may be utilized as either lifting motors or thrusting "motors" in implementations described herein. For example, fans, jets, turbojets, turbo fans, jet engines, internal combustion engines, and the like may be used (either with propellers or other devices) to provide lift for the UAV.

In addition to the lifting motors 106 and lifting propellers 102, the UAV 100 may also include one or more thrusting motors 110 and corresponding thrusting propellers 112. The thrusting motors and thrusting propellers may be the same or different than the lifting motors 106 and lifting propellers 102. For example, in some implementations, the thrusting propellers may be formed of carbon fiber and be approximately eighteen inches long. In other implementations, the thrusting motors may utilize other forms of propulsion to propel the UAV. For example, fans, jets, turbojets, turbo fans, jet engines, internal combustion engines, and the like may be used (either with propellers or with other devices) as the thrusting motors.

The thrusting motors and thrusting propellers may be oriented at approximately ninety degrees with respect to the perimeter frame 104 and central frame 107 of the UAV 100 and utilized to increase the efficiency of flight that includes a horizontal component. For example, during transit flight, flight that includes a horizontal component, the thrusting motors may be engaged to provide a horizontal thrust force via the thrusting propellers to propel the UAV 100 horizontally. As a result, the speed and power utilized by the lifting motors 106 may be reduced. Alternatively, in selected implementations, the thrusting motors may be oriented at an angle greater or less than ninety degrees with respect to the perimeter frame 104 and the central frame 107 to provide a combination of thrust and lift.

In the example illustrated in FIG. 1, the UAV 100 includes two thrusting motors 110-1, 110-2 and corresponding thrusting propellers 112-1, 112-2. Specifically, in the illustrated example, there is a front thrusting motor 110-1 coupled to and positioned near an approximate mid-point of the front wing 120. The front thrusting motor 110-1 is oriented such that the corresponding thrusting propeller 112-1 is positioned inside the perimeter frame 104. The second thrusting motor is coupled to and positioned near an approximate mid-point of the lower rear wing 124. The rear thrusting motor 110-2 is oriented such that the corresponding thrusting propeller 112-2 is positioned inside the perimeter frame 104.

While the example illustrated in FIG. 1 illustrates the UAV with two thrusting motors 110 and corresponding thrusting propellers 112, in other implementations, there may be fewer or additional thrusting motors and corresponding thrusting propellers. For example, in some implementations, the UAV 100 may only include a single rear thrusting motor 110 and corresponding thrusting propeller 112. In another implementation, there may be two thrusting motors and corresponding thrusting propellers mounted to the lower rear wing 124. In such a configuration, the front thrusting motor 110-1 may be included or omitted from the UAV 100. Likewise, while the example illustrated in FIG. 1 shows the thrusting motors oriented to position the thrusting propellers inside the perimeter frame 104, in other implementations, one or more of the thrusting motors 110 may be oriented such that the corresponding thrusting propeller 112 is oriented outside of the protective frame 104.

In the illustrated example, the UAV also includes an imaging component 150 that is coupled to the frame 104 of the UAV with a gimbal 152. The imaging component 150 is discussed in further detail below with respect to FIG. 2. The gimbal 152 may be a one, two, or three axis gimbal that is used to alter an orientation and/or position of the imaging component 150. Imaging components 150, in which the orientation, angle, or other position of the imaging component are adjustable with respect to the UAV 100, are referred to herein as adjustable imaging components. In other implementations, the imaging component may be directly coupled to and/or incorporated into the frame 104 of the UAV 100. Such imaging components 150, in which the orientation, angle, or other position of the imaging component is not adjustable with respect to the UAV 100 is referred to herein as a fixed imaging component. Regardless, for purposes of discussion, fixed imaging components and adjustable imaging component are referred to herein collectively as imaging components, unless specifically referenced otherwise.

While the example illustrated in FIG. 1 presents a single imaging component 150 coupled to a front of the UAV 100, in other implementations, multiple imaging components may be coupled to the UAV at any positions on the UAV. For example, the UAV may include fixed imaging components coupled at each corner junction 131-1, 131-2, 131-3, 131-4 and adjustable imaging components coupled to each side of the UAV.

The perimeter frame 104 provides safety for objects foreign to the UAV 100 by inhibiting access to the lifting propellers 102 from the side of the UAV 100, provides protection to the UAV 100, and increases the structural integrity of the UAV 100. For example, if the UAV 100 is traveling horizontally and collides with a foreign object (e.g., wall, building), the impact between the UAV 100 and the foreign object will be with the perimeter frame 104, rather than a propeller. Likewise, because the frame is interconnected with the central frame 107, the forces from the impact are dissipated across both the perimeter frame 104 and the central frame 107.

The perimeter frame 104 also provides a surface upon which one or more components of the UAV 100 may be mounted. Alternatively, or in addition thereto, one or more components of the UAV may be mounted or positioned within the cavity of the portions of the perimeter frame 104. For example, antennas may be included in the cavity of the perimeter frame and be used to transmit and/or receive wireless communications. The antennas may be utilized for Wi-Fi, satellite, near field communication ("NFC"), cellular communication, or any other form of wireless communication. Other components, such as cameras, time of flight sensors, accelerometers, inclinometers, distance-determining elements, gimbals, Global Positioning System (GPS) receiver/transmitter, radars, illumination elements, speakers, and/or any other component of the UAV 100 or the UAV control system (discussed below), etc., may likewise be mounted to or in the perimeter frame 104. Likewise, identification or reflective identifiers may be mounted to the perimeter frame 104 to aid in the identification of the UAV 100.

In some implementations, the perimeter frame 104 may also include a permeable material (e.g., mesh, screen) that extends over the top and/or lower surface of the perimeter frame 104 enclosing the central frame, lifting motors, and/or lifting propellers.

A UAV control system 114 is also mounted to the central frame 107. In this example, the UAV control system 114 is mounted to the hub 108 and is enclosed in a protective barrier. The protective barrier may provide the control system 114 weather protection so that the UAV 100 may operate in rain and/or snow without disrupting the control system 114. In some implementations, the protective barrier may have an aerodynamic shape to reduce drag when the UAV is moving in a direction that includes a horizontal component. The protective barrier may be formed of any materials including, but not limited to, graphite-epoxy, Kevlar, and/or fiberglass. In some implementations, multiple materials may be utilized. For example, Kevlar may be utilized in areas where signals need to be transmitted and/or received.

Likewise, the UAV 100 includes one or more power modules. The power modules may be positioned inside the cavity of the side rails 130-1, 130-2. In other implementations, the power modules may be mounted or positioned at other locations of the UAV. The power modules for the UAV may be in the form of battery power, solar power, gas power, super capacitor, fuel cell, alternative power generation source, or a combination thereof. For example, the power modules may each be a 6000 mAh lithium-ion polymer battery, or polymer lithium ion (Li-poly, Li-Pol, LiPo, LIP, PLI or Lip) battery. The power module(s) are coupled to and provide power for the UAV control system 114, the lifting motors 106, the thrusting motors 110, and the payload engagement mechanism (not shown).

In some implementations, one or more of the power modules may be configured such that it can be autonomously removed and/or replaced with another power module while the UAV is landed or in flight. For example, when the UAV lands at a location, the UAV may engage with a charging member at the location that will recharge the power module.

As mentioned above, the UAV 100 may also include a payload engagement mechanism. The payload engagement mechanism may be configured to engage and disengage items and/or containers that hold items (payload). In this example, the payload engagement mechanism is positioned beneath and coupled to the hub 108 of the frame 104 of the UAV 100. The payload engagement mechanism may be of any size sufficient to securely engage and disengage a payload. In other implementations, the payload engagement mechanism may operate as the container in which it contains item(s). The payload engagement mechanism communicates with (via wired or wireless communication) and is controlled by the UAV control system 114. Example payload engagement mechanisms are described in U.S. Pat. No. 9,573,684, filed Sep. 30, 2014, titled "UNMANNED AERIAL VEHICLE DELIVERY SYSTEM," the subject matter of which is incorporated by reference herein in its entirety.

Figure 2:
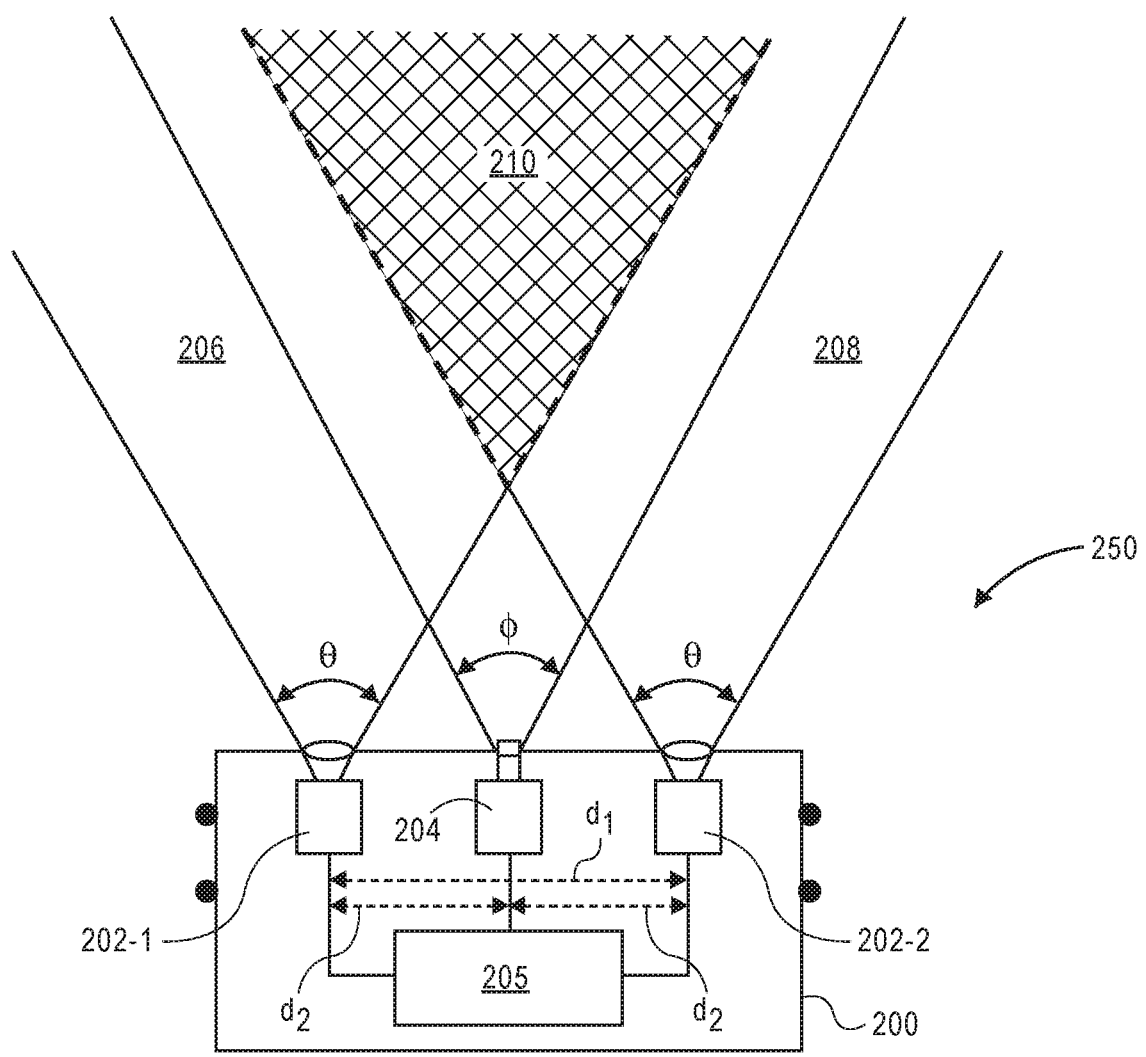
FIG. 2 illustrates an imaging component that may be used with an unmanned aerial vehicle, according to an implementation.

FIG. 2 illustrates an imaging component 250 that may be used with and coupled to a UAV, such as the UAV 100 discussed above with respect to FIG. 1, according to an implementation. In this example, the imaging component 250 includes three imaging devices, or cameras, 202-1, 202-2, 204, all of which are positioned in the same plane and affixed to a frame at defined baseline distance from one another. Any type of camera and/or configuration of cameras may be used with the implementations described herein. For example, one or more of the cameras may be a red, green, blue ("RGB") color camera, also referred to herein as a visual light camera, a still camera, a motion capture/video camera or any other type or form of camera. In other implementations, one or more of the cameras may be depth-sensing cameras, such as an RGBz camera. In still other implementations, one or more of the cameras may be a thermographic or infrared (IR) camera.

Additionally, in some implementations, the cameras may simply be camera modules that include a lens and an image sensor. The image sensor may convert an optical image obtained by the lens of the camera into a digital signal or digital representation of the image (generally referred to herein as image data). In one implementation, the image sensor may be a RGB sensor capable of supporting an image resolution of at least 860×480 at six frames per second. The image sensor may likewise be configured to provide the image data to other components (e.g., a graphics processing unit) for processing. In some implementations, cameras, such as visual cameras, may be paired to provide stereo imagery and depth information. A stereo camera may include a pair of camera modules. Image data may be stored in any variety of formats including, but not limited to, YUYV, RGB, RAW, .bmp, .jpeg, .gif, or the like.

Cameras operate by electronically capturing reflected light from objects and assigning quantitative values to one or more aspects of the reflected light, such as pixels. A camera may include one or more sensors having one or more filters associated therewith. The sensors of a camera may capture information regarding any number of pixels of the reflected light corresponding to one or more base colors (e.g., red, green or blue) expressed in the reflected light, and store values associated with the pixel colors as image data and/or transmit image data to another device for further analysis or reproduction. The camera may also be configured to determine depth information, such as the distance between the camera and an object in the field of view of the camera. Depth information may be included in the image data generated by the camera.

Imaging devices such as cameras operate by capturing light that is reflected from objects, and by subsequently calculating or assigning one or more quantitative values to aspects of the reflected light, e.g., pixels, generating an output based on such values, and storing such values in one or more data stores. For example, digital cameras may include one or more sensors having one or more filters associated therewith, and such sensors may detect information regarding aspects of any number of pixels of the reflected light corresponding to one or more base colors (e.g., red, green or blue) of the reflected light. Such sensors may generate data files including such information, and store such data files in one or more onboard or accessible data stores (e.g., a hard drive or other like component), as well as one or more removable data stores (e.g., flash memory devices), or displayed on one or more broadcast or closed-circuit television networks, or over a computer network, such as the Internet. Data files that are stored in one or more data stores may be printed onto paper, presented on one or more computer displays, or subjected to one or more analyses, such as to detect objects represented therein.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Thermal imaging, which is generated using thermographic cameras, such as long range IR cameras, detect radiation from an object in the infrared spectrum and produce images of that radiation, called thermograms. Infrared radiation is emitted by all objects with a temperature above absolute zero. The amount of emitted radiation by an object increases with temperature, therefor, thermography allows one to see variation in temperature within a represented scene.

Returning to FIG. 2, the imaging component 250 in this example includes two paired visual cameras 202-1, 202-2 that are coupled to a frame at fixed positions with respect to one another and separated by a known baseline distance ($d_1$). The two visual cameras 202-1, 202-2 have a similar field of view 206, 208. In other implementations, the two visual cameras may have different fields of view. Regardless, the baseline distance ($d_1$) that separates the two visual cameras and the orientation of the cameras with respect to one another are arranged such that at least a portion of the two fields of view 206, 208 overlap to form an effective field of view 210. Objects positioned within the effective field of view 210 are detectable by both visual cameras 202-1, 202-2 and images formed by the two cameras will both include representations of the object within the effective field of view 210.

During pairing, the two visual cameras 202-1, 202-2 are calibrated such that the pixel information for each camera corresponding to portions within the effective field of view 210 are correlated such that image information within the effective field of view from the two paired cameras can be merged and, with knowledge of the baseline distance ($d_1$), depth information for objects within the field of view may be generated. The depth information may be associated with the corresponding pixel information to form a depth map corresponding to the scene within the effective field of view 210. In this example, the two visual cameras 202-1, 202-2 are paired and calibrated with the processing component 205. As images are formed by each of the cameras 202-1, 202-2, the formed visual images are sent to the processing component 205 and the processing component 205 processes the two images using the calibration information to generate depth information for objects within the effective field of view 210. The resulting depth information may be associated with the pixels of the images, thereby providing a depth or protrusion of objects above a surface within the scene.

In addition to including a pair of visual cameras 202-1, 202-2 for obtaining depth information corresponding to a scene within the effective field of view, the imaging component 250 includes a third camera, in this example a long wave IR camera 204. In the illustrated example, the third camera is positioned approximately equidistant between the first camera 202-1 and the second camera 202-2. By positioning the IR camera 204 between the first camera 202-1 and the second camera 202-2, the field of view of the IR camera 204 covers at least a portion of the effective field of view 210. In the illustrated example, the field of the view of the IR camera 204 covers all of the effective field of view 210. In other implementations, the third camera may be positioned elsewhere provided that the all three cameras have an overlapping field of view and can be calibrated with respect to one another. For example, the imaging component may include the two visual cameras adjacent one another and the long wave IR camera 204 positioned adjacent only one of the visual cameras. In other implementations, the long wave IR camera 204 may be offset above or below the two visual cameras.

When the imaging component 250 is formed, in addition to calibrating the two visual cameras 202-1, 202-2 so that depth information can be obtained, the IR camera 204 is also calibrated so that the pixel information within the effective field of view 210 that is encompassed by the field of view of view of the IR camera 204 is correlated with the pixel information of the IR camera 204. By calibrating the three cameras 202-1, 202-2, 204, the pixel information from each of the cameras corresponding to the effective field of view 210 is associated and maintained by the processing component 205. Once calibrated, each pixel information within the effective field of view 210 that corresponds to each of the three cameras 202-1, 202-2, 204 includes a horizontal dimension, a vertical dimension, a depth dimension, a thermal dimension (or IR dimension), and optionally, the original pixel value information from the visual light image(s). The horizontal dimension and vertical dimension remain constant for each pixel information and are calibrated across the three cameras. The depth dimension is determined by the processing component 205 and represents a depth of the object represented by the pixel with respect to the imaging component 250. The thermal dimension is determined by the processing component from the received IR image and represents a radiation of the object represented by the pixel as detected by the IR camera 204.

During operation, images obtained of a scene (e.g., delivery location, landing location, etc.) within the effective field of view 210 by the three cameras 202-1, 202-2, 204 are provided to the same processing component 205 of the imaging component 250. The processing component utilizes the associated pixel information to process the visual images received from the visual cameras 202-1 and 202-2 to determine depth information corresponding to objects represented in the effective field of view of the two images. Likewise, the processing component 205 utilizes the IR image obtained from the IR camera 204 to determine an IR or thermal representation for each pixel position within the effective field of view. In some implementations, the processing component may correlate a different color of a series of colors and/or value of a series of values to represent thermal radiation detected at different ranges. For example, the processing component 205 may assign one of three different color values to a pixel based on a measured IR for the pixel depending on a range in which the measured IR falls. The horizontal dimension, vertical dimension, depth dimension, and thermal dimension is provided from the processing component to the UAV control system as combined information representative of the scene within the overlapping field of view of the cameras of the imaging component.

While the illustrated example utilizes a single processing component 205 that is part of the imaging component 250, in other implementations the imaging component 250 may include multiple processing components that operate in conjunction or independently to generate the horizontal dimension, vertical dimension, depth dimension, and thermal dimension for each of the pixels within the effective field of view. For example, a first processing component may process the two visual images to determine depth information and a second processing component may process the IR image to determine the thermal dimension. In still other examples, the imaging component 250 may not include a processing component and formed images may be sent directly from the imaging component 250 to other components, such as one or more components of the UAV control system, for further processing. In yet another example, the formed images, and/or determined information (e.g., horizontal dimension, vertical dimension, depth dimension, and/or thermal dimension) may be transmitted from the UAV to another computing system, such as a remote computing system for processing.

Figure 3:
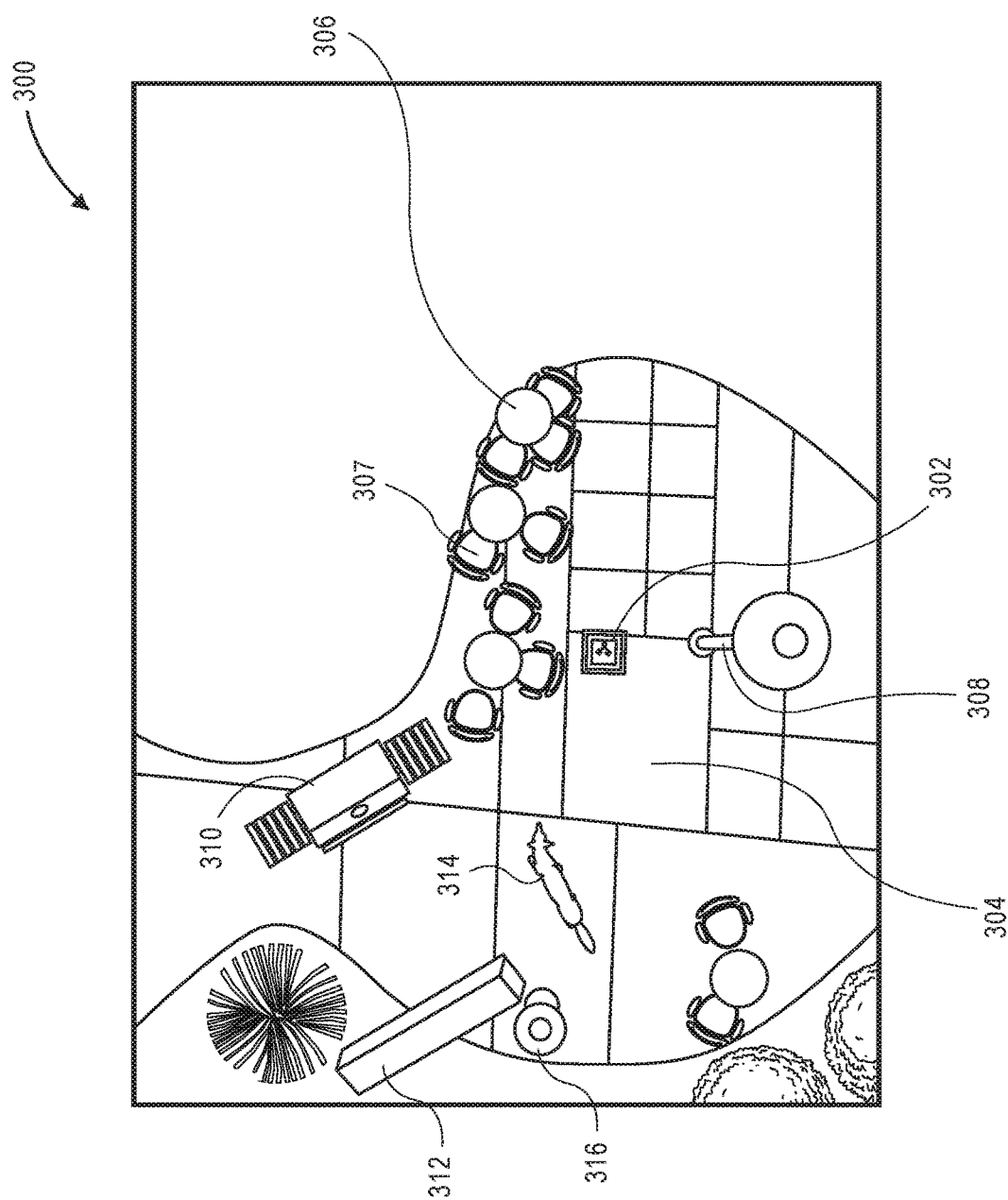
FIG. 3 illustrates a visual image of a delivery location obtained with one or more imaging devices of the imaging component of FIG. 2, according to an implementation.

FIG. 3 illustrates a visual light image 300 of a scene, in this example a delivery location, formed by a camera of the imaging component of FIG. 2, according to an implementation. As illustrated, the image 300 is obtained using the imaging component of a UAV while the UAV is aerially positioned above the delivery location. In this example, the scene includes multiple objects, such as tables 306, chairs 307, a BBQ grill 310, lamps 308, 316, a warm-blooded object 314, in this example a dog, and a large rectangular object 312. All of the objects are within a scene in which a delivery location identifier 302 is positioned. The delivery location identifier 302 may be used as a beacon or identifier that is detectable by the UAV as an intended delivery location for an item, such as an item ordered by a customer from an electronic commerce website for UAV delivery.

Figure 4A:
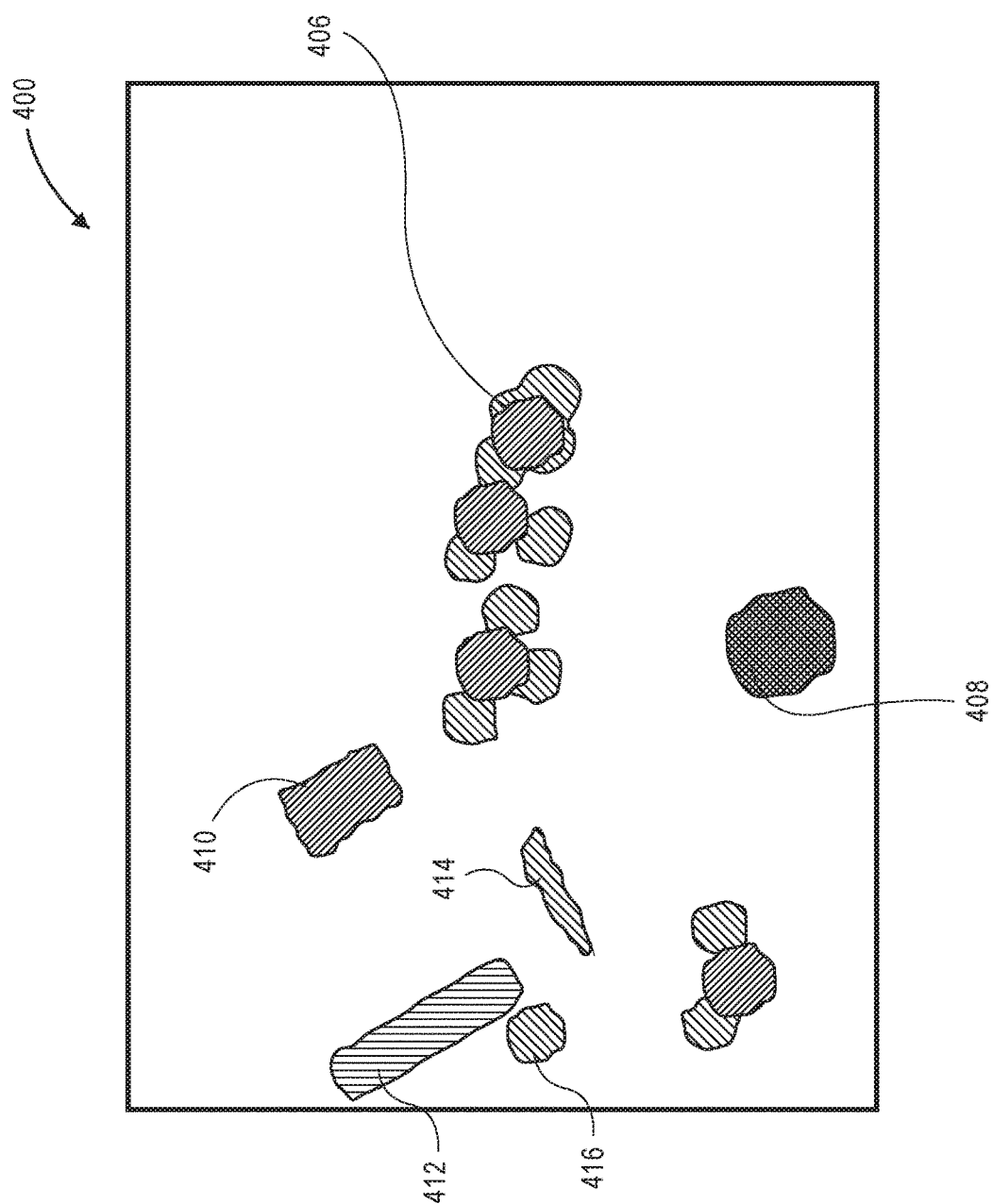
FIG. 4A illustrates a depth map of the delivery location, according to an implementation.

To properly detect and avoid objects during a descent of the UAV and ultimate delivery of an item, depth information corresponding to objects within the effective field of view of the imaging component are determined and a depth map is generated. For example, FIG. 4A illustrates a depth map 400 of the delivery location, according to an implementation. As discussed above, stereo-paired cameras of the imaging component may be used to generate depth information for the objects represented in the image based on a distance of the objects from the imaging component and/or a distance of the objects from a reference point, such as a surface area. As illustrated, because the protrusion of many objects above the surface are similar, it may be difficult for the UAV control system to accurately determine what is a warm-blooded object and what is not a warm-blooded object. For example, because the warm-blooded object 414 (the dog) protrudes a similar distance from the surface as the chairs 407, each have a similar depth information representation. In a similar manner, the tables 406 and grill 410 protrude a similar distance and therefore have similar depth information. Likewise, the lamp 416 and the large rectangular object 412 has similar protrusion distances and are similarly represented in the depth map. Finally, because the lamp 408 protrudes well above all other objects it is represented uniquely on the depth map 400.

While a depth map of the objects aids in detection of objects within a represented scene, it is difficult to assess from the depth map which objects are warm-blooded objects that are to be avoided and that may move and/or be injured if contacted by the UAV during descent compared to non-warm-blooded objects that will not move during descent, but need to be avoided. Accordingly, thermal information combined with depth information is beneficial to improve object detection and identification.

Figure 4B:
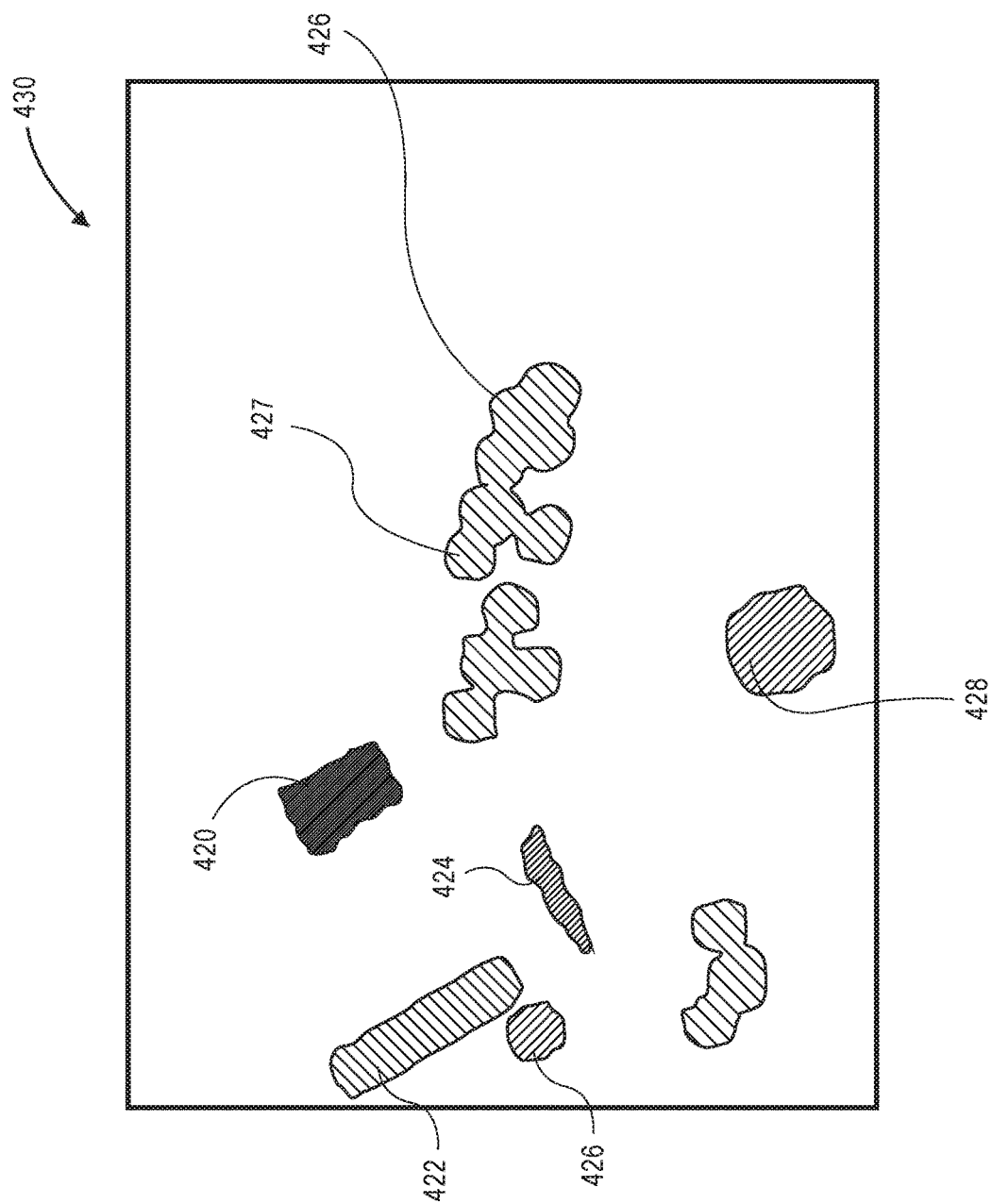
FIG. 4B illustrates a thermogram of the delivery location, according to an implementation.

FIG. 4B illustrates a thermogram 430 of the delivery location, according to an implementation. Similar to the depth map, the temperate based image may be used to identify objects, not by a protrusion from a surface (or distance from the imaging component) but from radiation emitting from the object. In this example, the tables, chairs, and large rectangular objects, do not emit much radiation and are therefore represented similarly in the thermogram 430. The BBQ grill 420, which in this example is in operation, emits a large amount of radiation and is represented differently in the thermogram 400. Likewise, the warm-blooded object 424 (dog), and the lamps 426, 428 also emit radiation and are separately represented in the thermogram 400.

While a thermogram of the objects aids in detection of objects that emit radiation within a represented scene, it is difficult to assess from the thermogram which objects are warm-blooded objects that are to be avoided and that may move and/or be injured if contacted by the UAV during descent compared to non-warm-blooded objects that will not move, but need to be avoided. For example, the lamps 428, 426 and/or BBQ grill 420 emit radiation that is similar to that of a warm-blooded animal, such as the warm-blooded object 424 that is detected by the IR camera.

Figure 5:
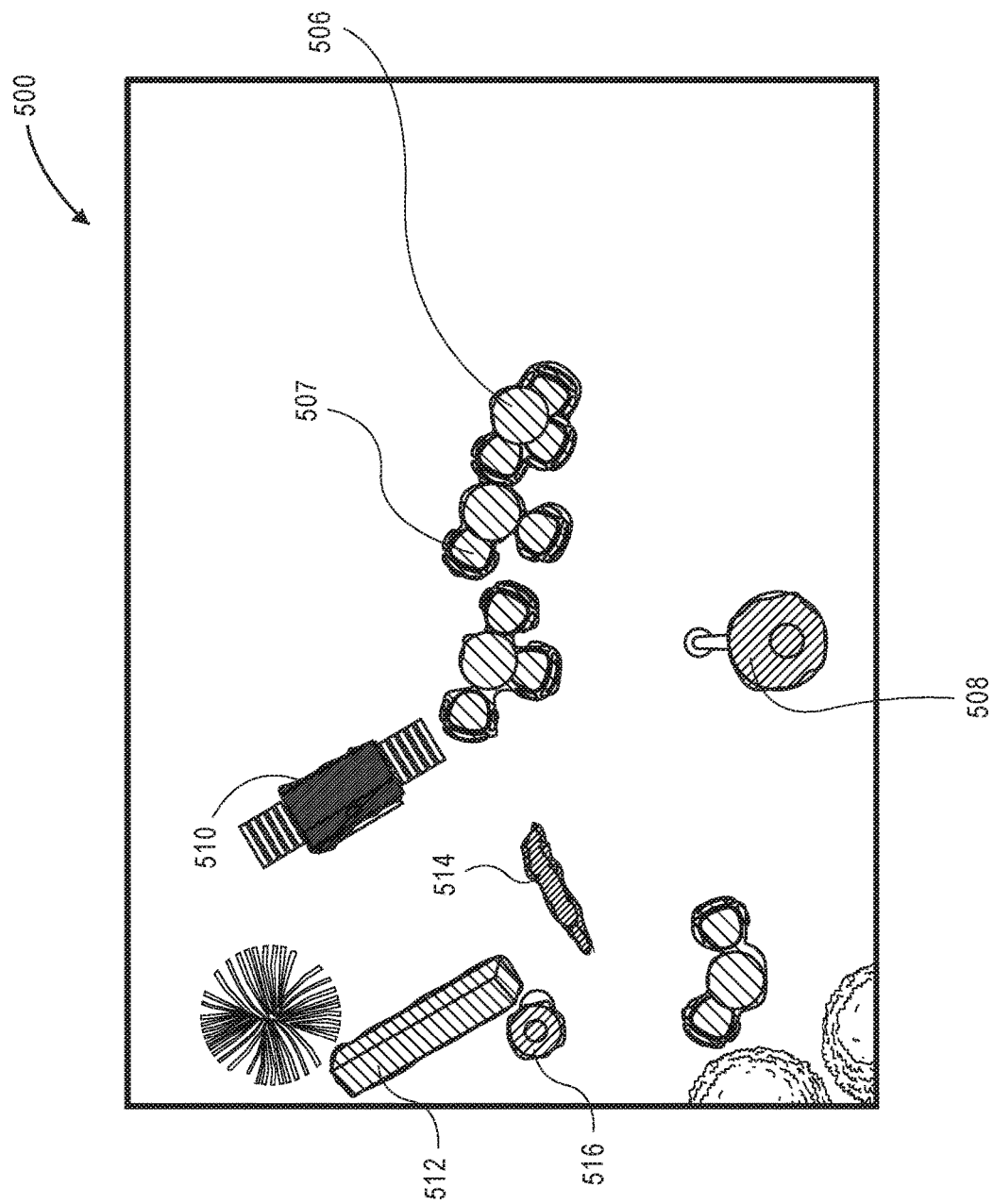
FIG. 5 is a depth and thermal representation of the delivery location produced from a combination of the depth map and the thermogram, according to an implementation.

By combining the depth information and the thermal information, the accuracy of detecting warm-blooded objects is improved. FIG. 5 represents a depth and thermal representation 500 of the delivery location, according to an implementation. To aid in illustration, the depth information is presented visually as the objects rather than as a hatch pattern. As shown, the depth of each object protruding above the surface is overlaid with the thermal information determined for each object thereby providing both depth and thermal information for each object within the delivery location. Utilizing the combination of both depth information and thermal information, the accuracy in distinguishing between warm-blooded and non-warm-blooded objects is increased. For example, the tables 506, chairs 507, and large rectangular object 512 can be determined to be non-warm-blooded objects because the thermal signature for those objects is lower than that expected for a warm-blooded object. Likewise, the lamp 508 can be determined to be a non-warm-blooded object because it protrudes well above the surface area (e.g., fifteen feet), more than the height expected for a warm-blooded object.

The remaining objects, the lamp 516, BBQ grill 510, and warm-blooded object 514 may then be avoided as potentially warm-blooded objects. Alternatively, or in addition thereto, additional processing may be performed with respect to those objects. For example, the objects may be monitored for a period of time to assess whether the objects move, thereby indicating that the objects are potentially warm-blooded. As another example, the thermal signature may be further processed to determine if the thermal signature is too high for a warm-blooded object. As another example, the overall shape and thermal signature of the objects may be compared to known shapes and thermal signatures representative of warm-blooded and non-warm-blooded objects to assess whether the object is warm-blooded or non-warm-blooded.

As still another example, additional image processing of one or more visual images of the objects may be performed using one or more object detection algorithms in an effort to identify or determine a type of object. In this example, by eliminating many objects using depth information and/or thermal information, the additional image processing required is reduced to only include those objects that could not be eliminated.

Figure 6:
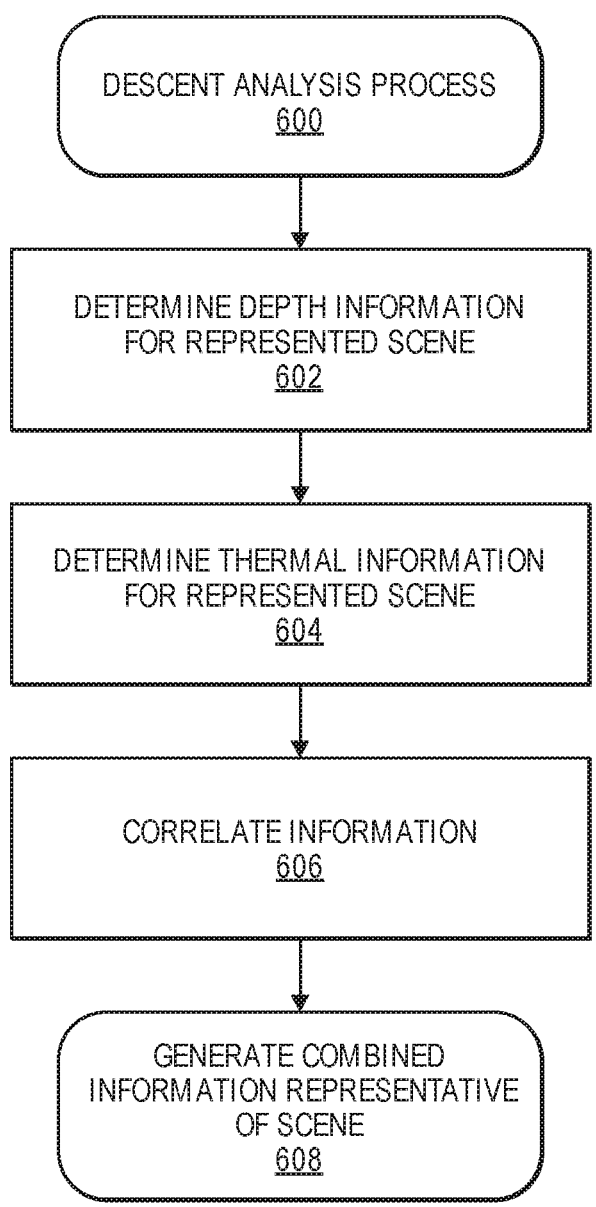
FIG. 6 is a flow diagram of an example descent analysis process, according to an implementation.

FIG. 6 is a flow diagram of an example descent analysis process 600, according to an implementation. This process, and each process described herein, may be implemented by the architectures described herein or by other architectures. The process is illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 600 begins by determining depth information for a represented scene, as in 602. As discussed above, depth information, or a depth map may be determined based on stereo-paired cameras that form visual images of the scene. The formed visual images are processed together, and utilizing the known baseline between the cameras, depth information for correlated pixels can be determined based on the objects represented in those pixels. In other implementations, other forms or types of devices may be used to determine depth information instead of or in addition to stereo-paired cameras. For example, a distance-determining element, such as a time of flight (ToF) sensor, LASER based range finder, ultrasonic distance meter, etc. may be used to determine depth information for objects within a range or distance of an aerial vehicle.

In addition to determining depth information, thermal information for the objects is determined, as in 606. As discussed above, thermal information may be determined utilizing a thermal imaging camera, such as a long wave IR camera, a medium wave IR camera, a near field IR camera, spectral imaging, etc. The thermal information may be represented as a difference between the thermal signatures of objects in the scene. For example, objects that emit less thermal energy may be represented with one color or value and objects that emit more thermal energy may be represented with a different color or value.

The depth information and thermal information is then correlated, as in 606. For example, the imaging component that is utilized to form images that are used to determine depth information and thermal information may be calibrated such that the horizontal dimension and vertical dimension of each pixel or other form of information generated by each camera is correlated to the same or similar physical position in the represented image.

Finally, utilizing the correlated information, combined information that includes the horizontal dimension, vertical dimension, depth dimension, and thermal dimension corresponding to the scene is generated, as in 608. The combined information may be stored in a data store or other form of memory, presented graphically, and/or otherwise processed.

Figure 7:
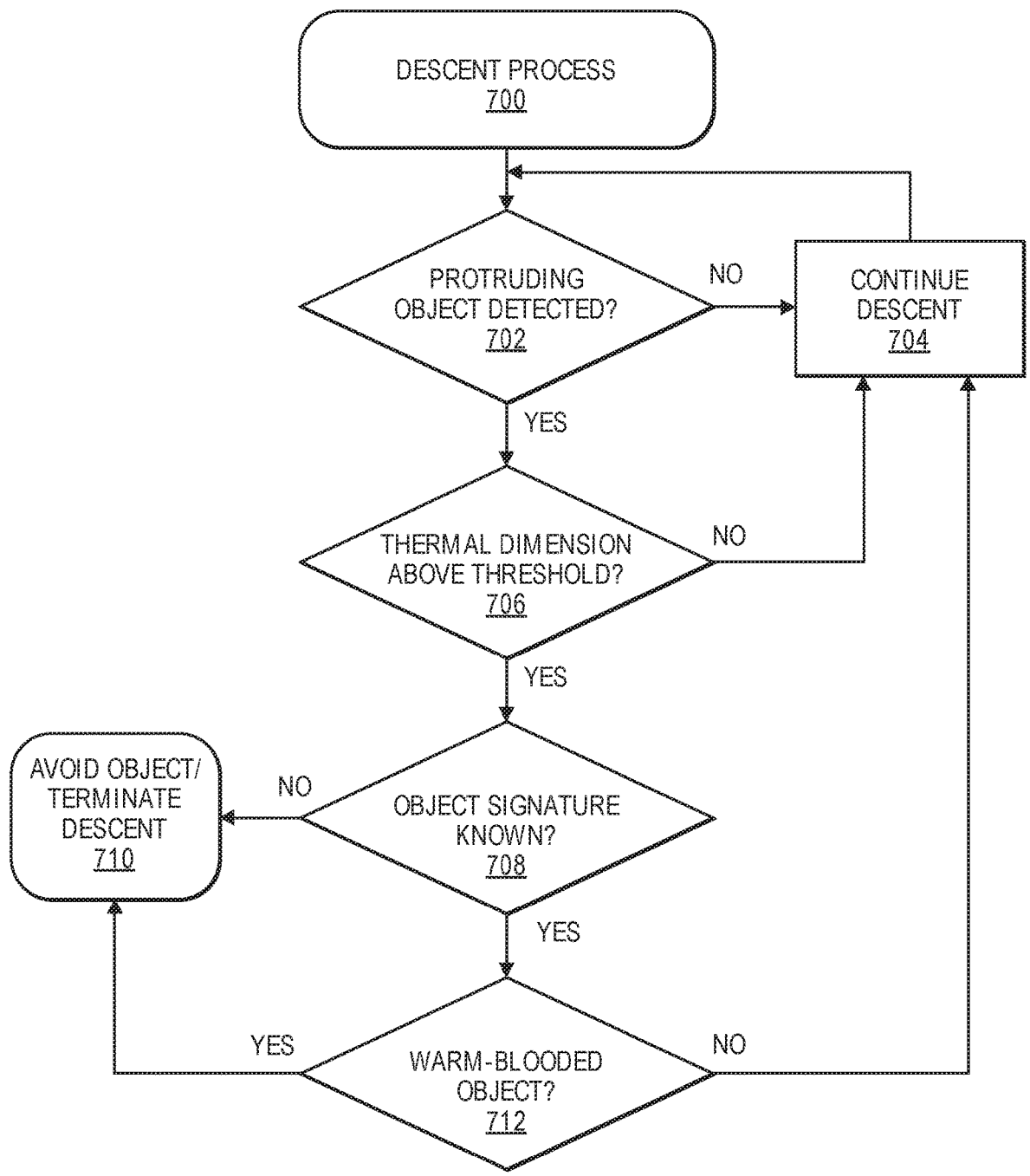
FIG. 7 is a flow diagram of an example descent process, according to an implementation.

FIG. 7 is a flow diagram of an example descent process 700, according to an implementation. The example process 700 may be performed during a descent of a UAV toward a location, such as a delivery location. As the UAV is descending, a determination is made as to whether an object protruding above the surface area is detected, as in 702. In some implementations, the protrusion may only be detected if the object protrudes more than a defined amount above the surface area (e.g., six inches). In other implementations, any protrusion may be detected and processed according to the example process 700.

If it is determined that no protrusion is detected, the descent of the UAV continues, as in 704, and the example process returns to decision block 702 and continues. However, if it is determined that a protrusion is detected, a determination is made as to whether a thermal dimension corresponding to the detected object exceeds a threshold, as in 706. The threshold may be any temperature range, may vary for different sizes and/or shapes of objects, vary for different locations, vary for different times of day, and/or vary for any other reason. In some implementations, the threshold may be a threshold difference between a lowest, or average thermal value detected in the represented information and the thermal value for the object determined to protrude above the surface.

The threshold may be a value above which a warm-blooded object may be detected. In other implementations, rather than determining whether the thermal signature corresponding to a detected object exceeds a threshold, a temperate range, or thermal difference above a baseline value in the represented information, within which warm-blooded objects may be detected is determined. In such an implementation, the example process 700 may determine whether the thermal signature for the detected object is within the determined temperature range.

If it is determined that the thermal dimension does not exceed the threshold, the example process returns to block 704 and continues. However, if it is determined that the thermal dimension exceeds the threshold, a determination is made as to whether a signature of the detected object is known, as in 708. For example, as objects are detected and determined to be warm-blooded or non-warm-blooded objects, overall signatures of those objects may be maintained in a data store. The overall signature may include a size, shape, protrusion, thermal dimension, etc. for the object. As additional detections of the same object are completed, the data store may be updated and a confidence level increased each time an overall signature of an object is determined to correspond to the same object. This feedback of object detection and overall signature correlation may be performed by multiple UAVs utilizing the example process and the results used by each UAV as part of the example process 700. For example, each time a UAV of a fleet of UAVs detects an object and determines whether the object is warm-blooded or non-warm-blooded, that information may be provided to remote computing resources that correlate information from all UAVs of the fleet. As information is correlated, an object signature data store representative of all detected objects is developed and maintained by the remote computing resources. That object signature data store may then be provided or otherwise utilized by each UAV of the fleet as part of the example process 700.

Returning to FIG. 7, if it is determined that the object signature for the object is not known, the object is avoided during descent and/or the descent may be terminated to avoid any potential interaction between the detected object and the UAV, as in 710. In some implementations, additional processing of the images and/or the object may be performed in an effort to determine the object. For example, visual images of the object may be processed using one or more object detection algorithms focused on the portion of the image that includes the object. In other examples, the object may be monitored for a period of time to determine whether the object is moving.

If it is determined at decision block 708 that the object signature is known, a determination is made as to whether the object is a warm-blooded object, as in 712. If it is determined that the object is a warm-blooded object, the object is avoided during descent and/or the descent is terminated to avoid any potential interaction between the detected object and the UAV. If it is determined that the object is not a warm-blooded object, i.e., the object is a non-warm-blooded object, the example process 700 returns to block 704 and descent of the UAV continues. In some implementations, if the object is detected and determined to be a non-warm blooded object, a further determination may be made as to whether the detected object is potentially harmful to the UAV and to be avoided at a greater distance than avoiding contact with the object. For example, if the object is determined to have a very high thermal signature, such as a BBQ grill or open flame, it may be determined that a minimum safe distance (e.g., fifteen feet) is to be maintained between the UAV and the object.

While the examples discussed above relate to detecting protruding objects and avoiding those objects with thermal signatures that potentially correspond to warm-blooded objects, similar implementations may be used to avoid non-warm-blooded objects that are potentially dangerous landing areas. For example, the implementations discussed herein may be used to detect bodies of water (e.g., pools, ponds, Jacuzzis) that are to be avoided for landing and/or payload delivery. Such detection is possible regardless of whether the body of water protrudes above the surface (such as an above-ground pool) or not. In implementations where the object (body of water) does not protrude above the surface, the depth information may present a substantially flat surface area and the thermal information may indicate that the object is either below an average threshold temperature of other objects in the scene (for cold bodies of water) or above an average threshold temperature (for warm bodies of water). The size, shape, and thermal information provides an indication that the object is a body of water and should not be used for a landing or payload delivery area.

Figure 8:
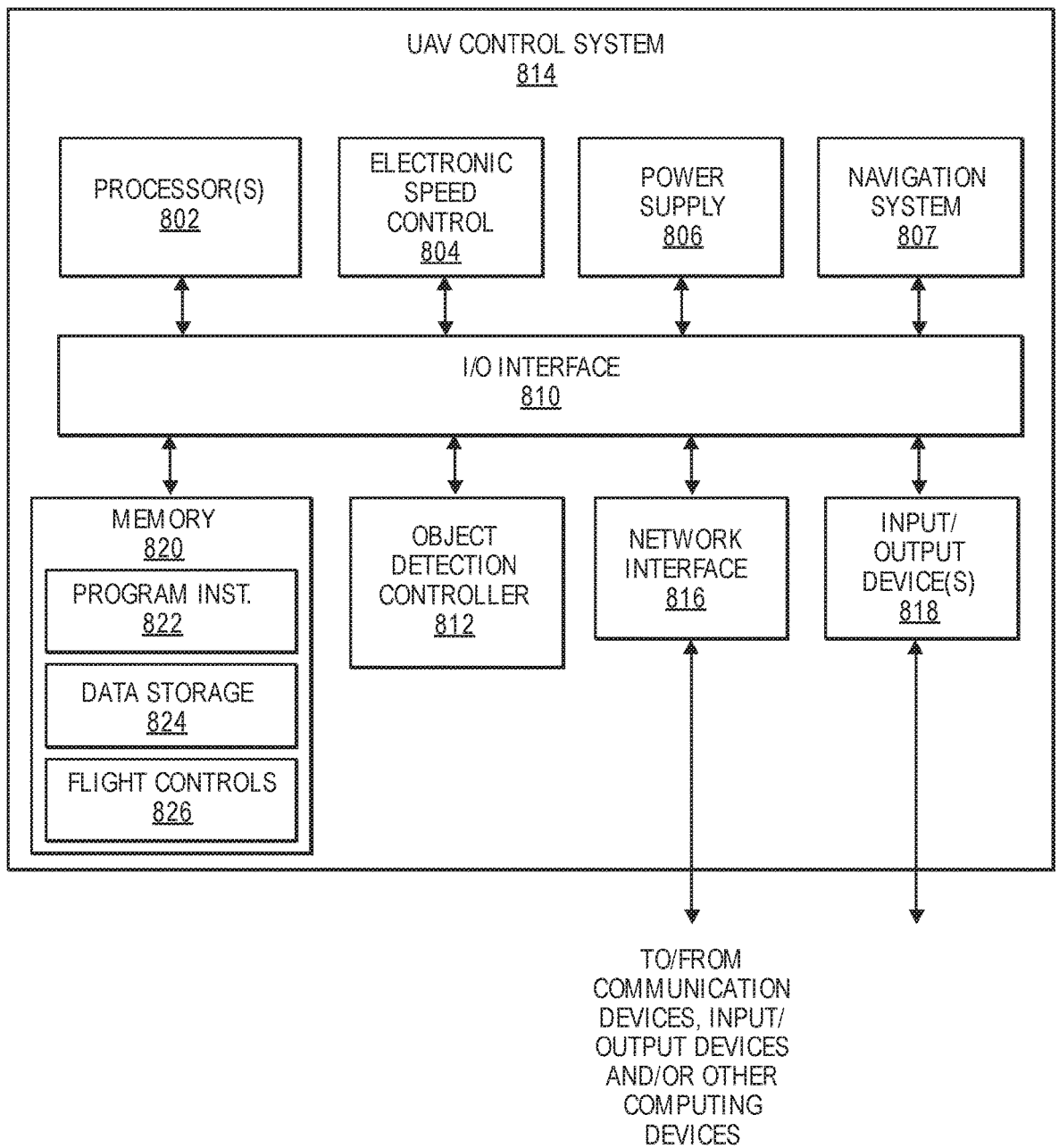
FIG. 8 is a block diagram of an illustrative implementation of an aerial vehicle control system that may be used with various implementations.

FIG. 8 is a block diagram illustrating an example UAV control system 814. In various examples, the block diagram may be illustrative of one or more aspects of the UAV control system 114 (FIG. 1) that may be used to implement the various systems and methods discussed herein and/or to control operation of the UAVs described herein. In the illustrated implementation, the UAV control system 814 includes one or more processors 802, coupled to a memory, e.g., a non-transitory computer readable storage medium 820, via an input/output (I/O) interface 810. The UAV control system 814 may also include electronic speed controls 804 (ESCs), power supply modules 806, a navigation system 807, and/or an object detection controller 812. In some implementations, the navigation system 807 may include an inertial measurement unit (IMU). The UAV control system 814 may also include a network interface 816, and one or more input/output devices 818.

In various implementations, the UAV control system 814 may be a uniprocessor system including one processor 802, or a multiprocessor system including several processors 802 (e.g., two, four, eight, or another suitable number). The processor(s) 802 may be any suitable processor capable of executing instructions. For example, in various implementations, the processor(s) 802 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 802 may commonly, but not necessarily, implement the same ISA.

The non-transitory computer readable storage medium 820 may be configured to store executable instructions, data, flight paths, flight control parameters, object signatures, and/or data items accessible by the processor(s) 802. In various implementations, the non-transitory computer readable storage medium 820 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 820 as program instructions 822, data storage 824 and flight controls 826, respectively. In other implementations, program instructions, data, and/or flight controls may be received, sent, or stored upon different types of computer-accessible media, such as non-transitory media, or on similar media separate from the non-transitory computer readable storage medium 820 or the UAV control system 814. Generally speaking, a non-transitory, computer readable storage medium may include storage media or memory media such as magnetic or optical media, e.g., disk or CD/DVD-ROM, coupled to the UAV control system 814 via the I/O interface 810. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 816.

In one implementation, the I/O interface 810 may be configured to coordinate I/O traffic between the processor(s) 802, the non-transitory computer readable storage medium 820, and any peripheral devices, the network interface 816 or other peripheral interfaces, such as input/output devices 818. In some implementations, the I/O interface 810 may perform any necessary protocol, timing or other data transformations to convert data signals from one component (e.g., non-transitory computer readable storage medium 820) into a format suitable for use by another component (e.g., processor(s) 802). In some implementations, the I/O interface 810 may include support for devices attached through various types of peripheral buses, such as a variant of the Peripheral Component Interconnect (PCI) bus standard or the Universal Serial Bus (USB) standard, for example. In some implementations, the function of the I/O interface 810 may be split into two or more separate components, such as a north bridge and a south bridge, for example. Also, in some implementations, some or all of the functionality of the I/O interface 810, such as an interface to the non-transitory computer readable storage medium 820, may be incorporated directly into the processor(s) 802.

The ESCs 804 communicate with the navigation system 807 and adjust the rotational speed of each lifting motor and/or the thrusting motor to stabilize the UAV and guide the UAV along a determined flight path. The navigation system 807 may include a GPS, indoor positioning system (IPS), IMU or other similar systems and/or sensors that can be used to navigate the UAV 100 to and/or from a location. The object detection controller 812 communicates tithe memory 820 and the imaging device discussed above may be process information and determine if objects are present that are to be avoided and/or if a descent is to be terminated.

The network interface 816 may be configured to allow data to be exchanged between the UAV control system 814, other devices attached to a network, such as other computer systems (e.g., remote computing resources), and/or with UAV control systems of other UAVs. For example, the network interface 816 may enable wireless communication between the UAV that includes the control system 814 and a UAV control system that is implemented on one or more remote computing resources. For wireless communication, an antenna of an UAV or other communication components may be utilized. As another example, the network interface 816 may enable wireless communication between numerous UAVs. In various implementations, the network interface 816 may support communication via wireless general data networks, such as a Wi-Fi network. For example, the network interface 816 may support communication via telecommunications networks, such as cellular communication networks, satellite networks, and the like.

Input/output devices 818 may, in some implementations, include one or more displays, imaging devices, thermal cameras, infrared sensors, time of flight sensors, accelerometers, pressure sensors, weather sensors, cameras, gimbals, landing gear, etc. Multiple input/output devices 818 may be present and controlled by the UAV control system 814. One or more of these sensors may be utilized to assist in landing as well as to avoid obstacles during flight.

As shown in FIG. 8, the memory may include program instructions 822, which may be configured to implement the example routines and/or sub-routines described herein. The data storage 824 may include various data stores for maintaining data items that may be provided for determining flight paths, object detection, landing, identifying locations for disengaging items, engaging/disengaging the thrusting motors, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV control system 814 is merely illustrative and is not intended to limit the scope of the present disclosure. In particular, the computing system and devices may include any combination of hardware or software that can perform the indicated functions. The UAV control system 814 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV control system 814. Some or all of the system components or data structures may also be stored (e.g., as instructions or structured data) on a non-transitory, computer-accessible medium or a portable article to be read by an appropriate drive. In some implementations, instructions stored on a computer-accessible medium separate from the UAV control system 814 may be transmitted to the UAV control system 814 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other UAV control system configurations.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
   receiving, from a first camera coupled to an aerial vehicle and having a first orientation, first image data of a scene using visible light;
   receiving, from a second camera coupled to the aerial vehicle and having the first orientation, second image data of the scene using visible light;
   receiving, from a sensor coupled to the aerial vehicle and having the first orientation, sensor data representative of the scene;
   processing the first image data, the second image data, and the sensor data to produce a combined information representative of the scene;
   detecting an object represented in the combined information;
   determining that an object signature of the object, as represented in the combined information, is an unknown object signature; and
   in response to determining that the object signature is an unknown object signature, performing additional processing of at least a portion of the combined information to determine the object;
   wherein the first camera, the second camera, and the sensor are positioned in a same plane; and
   wherein the sensor is positioned approximately equidistant between the first camera and the second camera.

2. The method of claim 1, wherein the combined information includes a horizontal dimension, a vertical dimension, and a depth dimension.

3. The method of claim 1, further comprising:
   determining, based at least in part on the first image data, the second image data, and the sensor data, that the object is an object to avoid.

4. The method of claim 1, wherein the sensor is at least one of an infrared sensor or an ultrasonic sensor.

5. The method of claim 1, wherein a first field of view of the first camera, a second field of view of the second camera, and a third field of view of the sensor overlap to form an effective field of view.

6. The method of claim 1, wherein the first orientation is downward with respect to the aerial vehicle and the scene includes an area toward which the aerial vehicle is descending.

7. A method, comprising:
   receiving, from a first image capture device at a first position on an aerial vehicle, first image data representative of at least a portion of a scene using a visible light spectrum;
   receiving, from a second image capture device at a second position on the aerial vehicle, second image data representative of at least a portion of the scene using the visible light spectrum;
   receiving, from a third image capture device at a third position on the aerial vehicle, third image data representative of at least a portion of the scene using a light spectrum other than the visible light spectrum;
   detecting, based at least in part on one or more of the first image data, the second image data, or the third image data, an object;

determining that an object signature of the object is an unknown object signature; and in response to determining that the object signature is an unknown object signature, performing additional processing of at least a portion of one or more of the first image data, the second image data, or the third image data to determine the object;

wherein the first image capture device, the second image capture device, and the third image capture device are positioned in a same plane; and wherein the third image capture device is positioned approximately equidistant between the first image capture device and the second image capture device.

8. The method of claim 7, further comprising:

forming, based at least in part on the first image data and the second image data, a depth map corresponding to at least a portion of the scene, wherein each position of the depth map corresponds to a vertical dimension, a horizontal dimension, and a depth dimension.

9. The method of claim 8, further comprising:

combining the depth map and the third image data to form combined information representative of at least a portion of the scene.

10. The method of claim 7, further comprising:

sending an instruction to cause the aerial vehicle to descend toward a location represented in the scene.

11. The method of claim 7, further comprising:

processing at least one of the first image data, the second image data, or the third image data to detect a presence of a living object within an effective field of view.

12. The method of claim 11, wherein the effective field of view corresponds to at least a portion of the scene within a field of view of the first image capture device, the second image capture device, and the third image capture device.

13. A method, comprising:

receiving, from a first image capture device of a vehicle, first image data;

receiving, from a second image capture device of the vehicle, second image data;

processing the first image data and the second image data to form a depth map wherein each pixel representative of a position includes a horizontal dimension, a vertical dimension, and a depth dimension;

receiving third data from a sensor;

processing the third data to determine, for each corresponding horizontal dimension and vertical dimension, a thermal dimension;

generating combined information representative of a scene that includes for each pixel of the combined information the horizontal dimension, the vertical dimension, the depth dimension, and the thermal dimension;

determining, based at least in part on the thermal dimension, an object represented in the combined information;

determining that an object signature of the object, as represented in the combined information, is an unknown object signature; and in response to determining that the object signature is an unknown object signature, performing additional processing of at least a portion of the combined information to determine the object;

wherein the first image capture device, the second image capture device, and the sensor are positioned in a same plane; and wherein the sensor is positioned approximately equidistant between the first image capture device and the second image capture device.

14. The method of claim 13, wherein the first image capture device and the second image capture device form a stereo pair of image capture devices.

15. The method of claim 13, wherein the sensor from which the third data is received is a long wave infrared camera.

16. The method of claim 13, wherein a first field of view of the first image capture device and a second field of view of the second image capture device at least partially overlap to form an effective field of view.

17. The method of claim 13, further comprising:

determining, based at least in part on one or more of the depth map or the thermal dimension, that the object represented in one or more of the first image data, the second image data, or the third data is a warm-blooded object; and sending instructions to alter a navigation of the vehicle in response to determining that the object is potentially a warm-blooded object.

18. The method of claim 13, wherein:

the vehicle is an unmanned aerial vehicle; and the scene includes a delivery location to which the unmanned aerial vehicle is to descend.

19. The method of claim 13, further comprising:

determining, based on one or more of the horizontal dimension, the vertical dimension, the depth dimension, the thermal dimension, or the combined information, that the object is potentially a warm blooded object.

20. An unmanned aerial vehicle ("UAV") apparatus, comprising:

a frame;

a control system;

an imaging component that includes a thermographic camera having a field of view and a pair of visual cameras;

wherein the thermographic camera and the pair of visual cameras are positioned in a same plane;

wherein the thermographic camera is positioned approximately equidistant between the pair of visual cameras; and an image-processing component, configured to at least:

receive, from the thermographic camera, a thermogram representative of a scene within the field of view of the thermographic camera;

process the thermogram to detect an object represented in the scene;

determine that an object signature of the object, as represented in the thermogram, is an unknown object signature; and in response to a determination that the object signature is an unknown object signature, perform additional processing of the thermogram to determine the object.

21. The UAV apparatus of claim 20, wherein the image processing component is further configured to at least:

cause an action to be performed, wherein the action includes sending an instruction to the control system to cause the control system to alter a navigation of the UAV apparatus to avoid the object.

22. The UAV apparatus of claim 20, wherein the pair of visual cameras of the imaging component further includes:

a visual camera having a second field of view that at least partially overlaps with the field of view of the thermographic camera.

23. The UAV apparatus of claim 22, wherein the thermographic camera and the visual camera are calibrated so that first pixel information of the thermographic camera is correlated with second pixel information of the visual camera for the second field of view that at least partially overlaps with the field of view of the thermographic camera.

24. The UAV apparatus of claim 20, further comprising:
a gimbal coupled to the frame of the UAV; and
wherein the imaging component is coupled to the gimbal.

25. The UAV apparatus of claim 24, wherein the gimbal is at least one of a one axis gimbal, a two axis gimbal, or a three axis gimbal that is used to alter an orientation or a position of the imaging component.

26. The UAV apparatus of claim 20, further comprising:
a protective barrier that encloses the control system to provide weather protection so that the UAV apparatus may operate in a rain or a snow without disrupting the control system.

27. The UAV apparatus of claim 26, wherein the protective barrier has an aerodynamic shape to reduce a drag when the UAV apparatus is moving in a direction that includes a horizontal component.

28. The UAV apparatus of claim 26, wherein at least a portion of the protective barrier is formed of at least one of a graphite-epoxy, a Kevlar, or a fiberglass.

29. The method of claim 1, wherein the additional processing includes at least one of processing the at least a portion of the combined information using an object detection algorithm to determine the object, or monitoring the object for a period of time to determine whether the object is moving.

* * * * *